United States Patent
Chen

(10) Patent No.: US 10,914,388 B2
(45) Date of Patent: Feb. 9, 2021

(54) PRESS TYPE VALVE CORE

(71) Applicant: KUCHING INTERNATIONAL LTD., Tanzih Township, Taichung County (TW)

(72) Inventor: Mei-Li Chen, Tanzih Township, Taichung County (TW)

( * ) Notice: Subject to any disclaimer, the term of this patent is extended or adjusted under 35 U.S.C. 154(b) by 66 days.

(21) Appl. No.: 16/390,399

(22) Filed: Apr. 22, 2019

(65) Prior Publication Data

US 2020/0332904 A1    Oct. 22, 2020

(51) Int. Cl.
| | |
|---|---|
| F16K 5/18 | (2006.01) |
| F16K 3/08 | (2006.01) |
| F16K 15/03 | (2006.01) |
| F16K 41/08 | (2006.01) |

(52) U.S. Cl.
CPC .............. F16K 5/182 (2013.01); F16K 3/085 (2013.01); F16K 15/035 (2013.01); F16K 41/08 (2013.01)

(58) Field of Classification Search
CPC ........ F16K 5/182; F16K 3/085; F16K 15/035; F16K 41/08; F16K 31/44; F16K 31/52441; F16K 31/52408; F16K 31/523; F16K 31/528; B05B 1/1618; Y10T 137/9464; E03C 1/04; E03C 1/048; F16L 55/055
USPC .................................... 251/230, 82, 252, 77
See application file for complete search history.

(56) References Cited

U.S. PATENT DOCUMENTS

| | | | | |
|---|---|---|---|---|
| 3,220,695 | A * | 11/1965 | Jones | E03C 1/2306 251/263 |
| 5,421,552 | A * | 6/1995 | Wang | E03C 1/052 222/179 |
| 5,456,448 | A * | 10/1995 | Chou | E03C 1/04 251/229 |
| 6,276,659 | B1 * | 8/2001 | Wang | F16K 21/10 251/230 |
| 6,659,373 | B1 * | 12/2003 | Heren | B05B 1/3013 239/391 |
| 6,691,937 | B2 * | 2/2004 | Heren | B05B 1/3013 239/525 |
| 8,028,356 | B2 * | 10/2011 | Kao | F16K 31/52433 4/678 |
| 8,276,833 | B2 * | 10/2012 | Cheng | E03C 1/0409 239/447 |

* cited by examiner

Primary Examiner — Umashankar Venkatesan
Assistant Examiner — Andrew J Rost
(74) Attorney, Agent, or Firm — Egbert Law Offices, PLLC

(57) ABSTRACT

A press type valve core has a case, a pressing structure, a stem seat and a valve stem, wherein, the pressing structure is configured on one end of the case, and the other end of the case is communicated with a water supply pipe, the case is formed with two water outlets on its two ends, and the internal portion of the case is formed with first and second cavities, the stem seat is configured inside the case, the valve stem is configured inside the second cavity, and the valve stem is pivoted on the stem seat, to shift between the blocked and communicated state of the flow path between the first cavity and the second cavity. The valve stem uses a plurality of supporting wings to avoid biased abrasion and wearing between the valve stem and the stem seat, and to enhance reliability in controlling the flow path.

8 Claims, 6 Drawing Sheets

PRESS TYPE VALVE CORE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a pipe installation to control the flow path of fluid, and more particularly to an innovative design of a press type valve core.

2. Description of Related Art Including Information Disclosed Under 37 CFR 1.97 and 37 CFR 1.98

A conventional press type valve core installed inside a water faucet mainly consists of a case, a pressing structure, a stem seat and a valve stem, wherein, the case is for configuration of the pressing structure, the valve stem and the stem seat, the internal portion of the case is formed with at least one cavity, and when water comes from the water inlet end, passing through the valve core and flows to the water outlet end, the cavity acts as a space to hold the water.

The pressing structure mainly comprises a lock nut, a pressing component and a positioning component, wherein, the lock nut and the pressing component are respectively pivoted on the positioning component, the lock nut and the pressing component are face to face in the axial direction, the lock nut is used to press and actuate the pressing component, and the positioning component is to position the pressing component. Based on this, by repeatedly pressing the lock nut, the pressing component can have reciprocating movement between the two ends of a linear path, and when the pressing component moves to one end of aforesaid path, the positioning component can stop and fix the pressing component. By the next time when the lock nut presses the pressing component again, the pressing component moves to the other end of the aforesaid path, and the positioning component will stop and fix the pressing component again. The pressing component is axially sleeved with a spring. The spring is to provide an elastic force for the pressing component to go back toward the lock nut.

The stem seat is configured inside the case, and the valve stem is pivoted on the stem seat, so that the pressing component can actuate the valve stem to open or close the flow path between the cavity and the water inlet end. The valve stem can also be used to close or open the flow path between the cavity and the water outlet end.

In the conventional press type valve core, as the valve stem conducts reciprocating movement along the axial direction, in case of drastic change of water pressure or water hammer phenomenon, the valve stem may be subject to a force in a direction away from the axle center, and consequently, biased abrasion and wearing may occur between the valve stem and the stem seat, affecting the reliability of the valve core to control opening and closing of the flow path. Furthermore, due to the design requirement of water faucets, the valve core may be placed in a way that the axle center of the valve stem is horizontal or in a direction deviating from the vertical direction. Thus, the gravity may also cause the aforesaid abrasion and wearing between the valve stem and the stem seat.

BRIEF SUMMARY OF THE INVENTION

The main object of the present invention is to provide a press type valve core, aiming to make an innovative breakthrough by developing an ideal and practical new press type valve core structure featuring higher reliability in controlling the flow path.

To accomplish the aforesaid object, the present invention provides a press type valve core which comprises:

a case, one end of the case being the first end, the other end being the second end, the two sides of the case respectively having a first water outlet, the second end being communicated with a water supply pipe, the internal portion of the case being formed with a first cavity and a second cavity, the first cavity being communicated with each of the first water outlet, and the second cavity being communicated with the second end;

a pressing structure, the pressing structure being configured on the first end of the case, the pressing structure mainly comprising a lock nut, a pressing component and a positioning component, the lock nut being used to press and actuate the pressing component, the positioning component being used for positioning the pressing component, the pressing component being sleeved with a first spring, and the first spring being configured to provide an elastic force for the pressing component to go back toward the lock nut;

a stem seat, the stem seat being configured inside the case; and a valve stem, the valve stem being pivoted on the stem seat;

inside the case, an inner casing is coupled; one end of the inner casing is connected to the positioning component, the other end of the inner casing is connected to a liner bushing, the two sides of the inner casing are respectively configured with a second water outlet, each of the second water outlets is respectively communicated with each of the first water outlets, the first cavity and the second cavity are respectively formed inside the inner casing, and the first cavity is communicated with each of the second water outlets;

the internal portion of the inner casing is configured with a separator, the separator being located between the first cavity and the second cavity, and thus separating the first cavity from the second cavity; the separator has an intercommunicating pore along the axial direction, and the first cavity and the second cavity are communicated with each other through the intercommunicating pore;

the stem seat is configured on the annular inner edge of the liner bushing, and the stem seat is located between the second end and the second cavity; the stem seat has a plurality of channels, each of the channels being respectively communicated with the second end and the second cavity;

the valve stem is configured inside the second cavity, and the valve stem and the pressing component are face to face along the axial direction, so that the pressing component can press the valve stem to move toward the second end; one end of the valve stem adjacent to the separator is formed with a cap end, and the other end of the valve stem is pivoted on the stem seat; the cap end is sheathed with a seal; the outer diameter of the seal is larger than the inner diameter of the intercommunicating pore, so that the seal can block the communication between the intercommunicating pore and the second cavity; the valve stem is sleeved with a second spring between the cap end and the stem seat; one end of the second spring is pressed against the stem seat, and the other end is pressed against the cap end, so that the valve stem will move toward the separator; the peripheral radiating sides of the valve stem are configured with a plurality of supporting wings; the outer end of each of the supporting wings is respectively pressed against the peripheral wall of the second cavity, so as to enhance the motion stability of the valve stem.

Based on such an innovative and unique design, the present invention makes a substantial improvement upon the prior art by using the supporting wings to maintain the axle center of the valve stem, so as to avoid biased abrasion and wearing between the valve stem and the stem seat, and to enhance the reliability in controlling the flow path. This is indeed a practical inventive step.

DETAILED DESCRIPTION OF THE INVENTION

Figure 1:
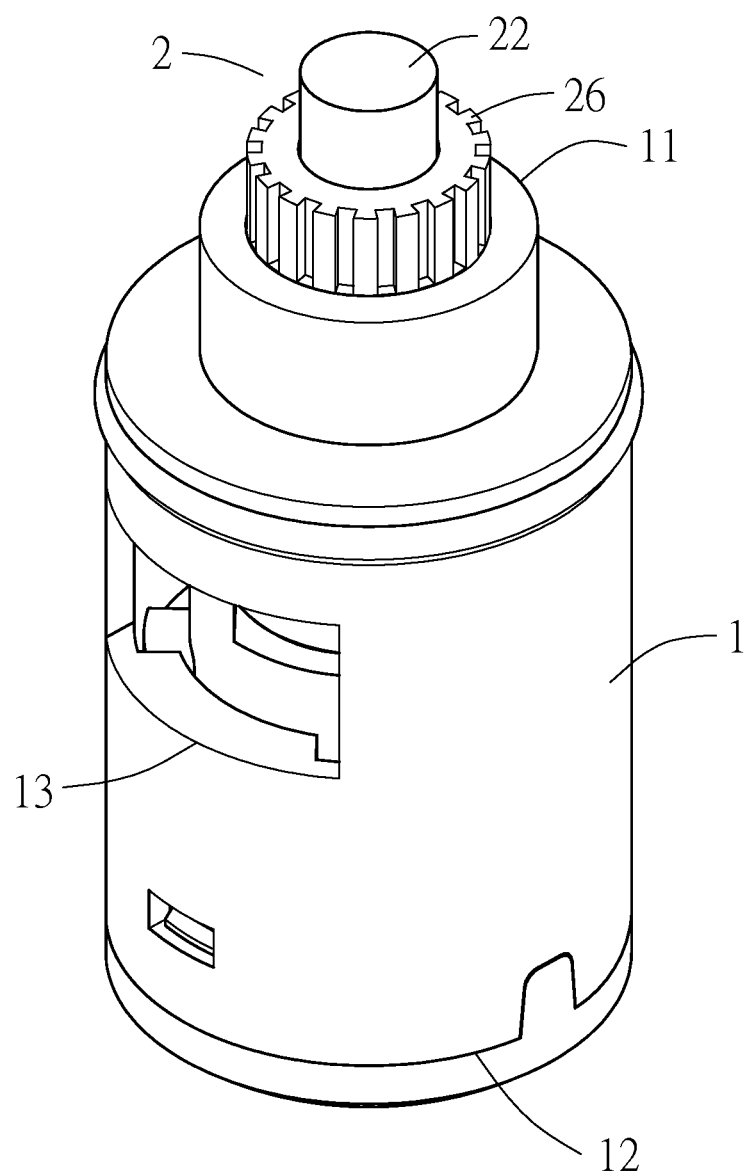
FIG. 1 is perspective view of a preferred embodiment of the present invention.
Figure 2:
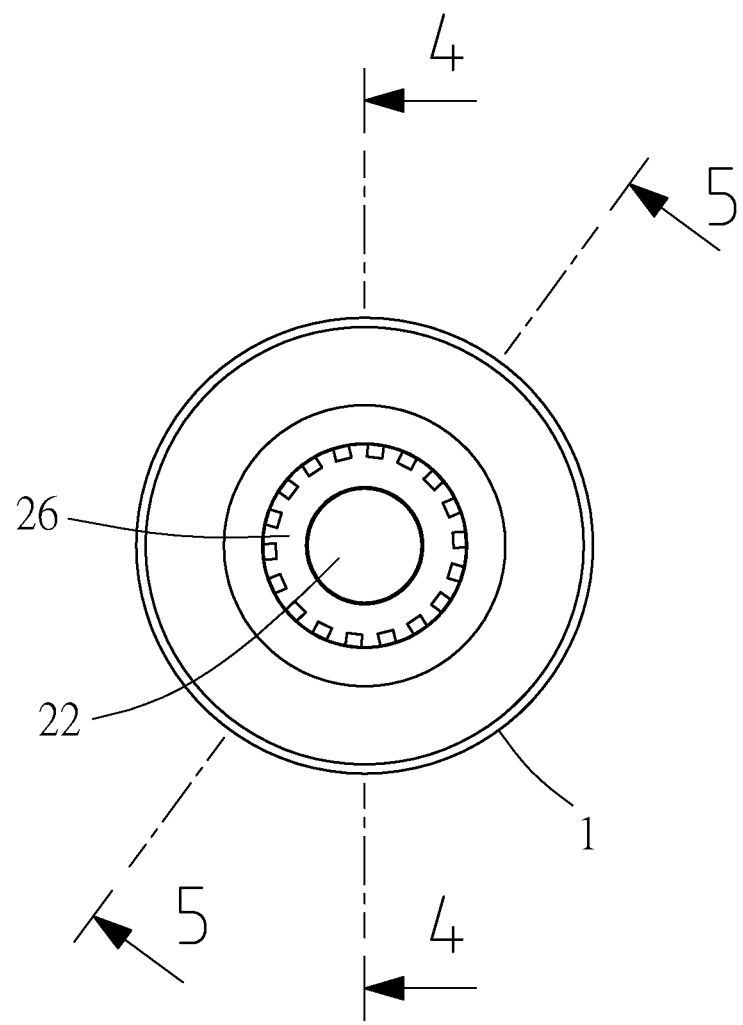
FIG. 2 is a top view of a preferred embodiment of the present invention.
Figure 3:
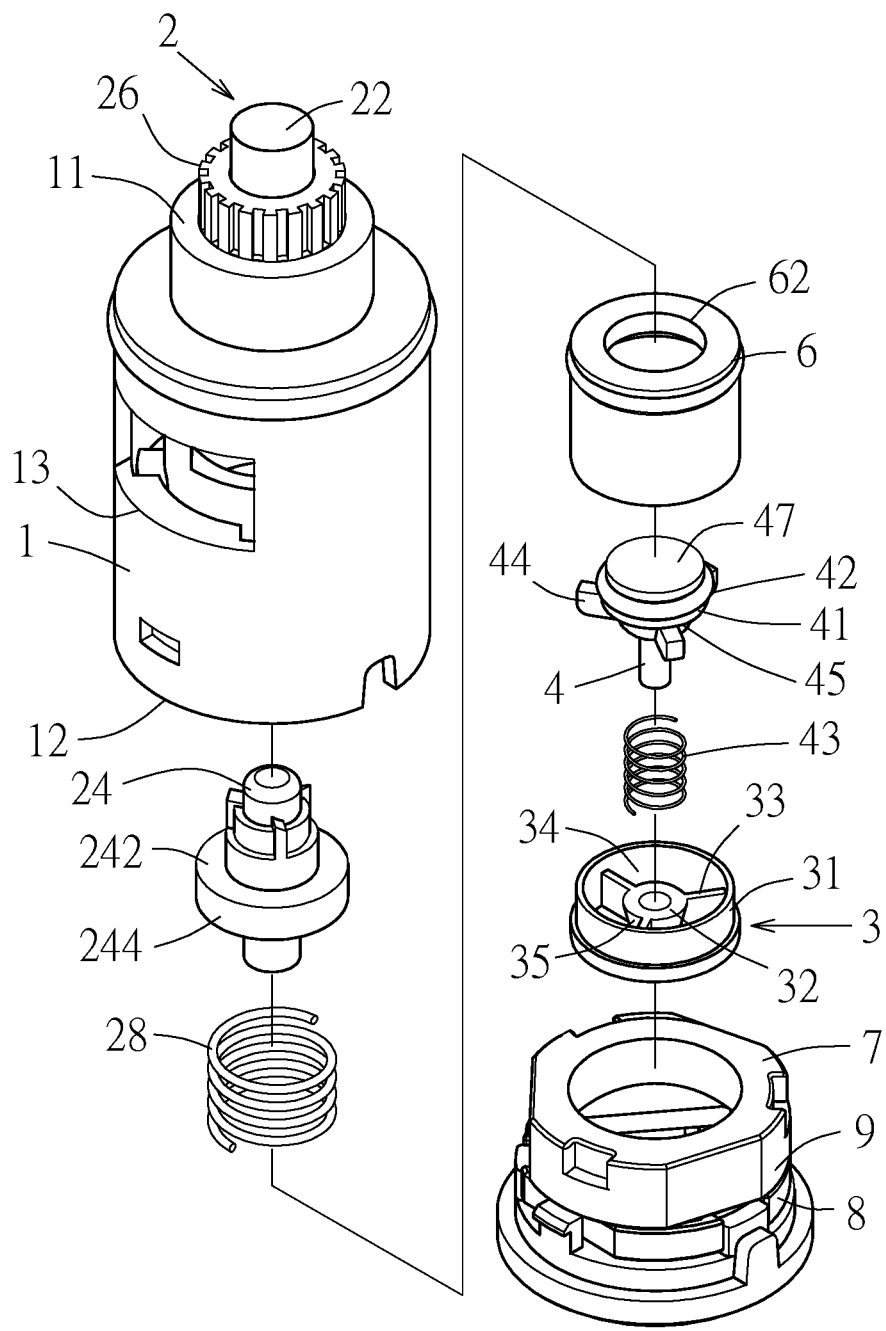
FIG. 3 is a partial exploded perspective view a preferred embodiment of the present invention.

A preferred embodiment of the present invention of a press type valve core is disclosed in FIG. 1 to FIG. 5. While such an embodiment is illustrative only, it is not intended to limit the scope of invention.

Referring to FIG. 1 to FIG. 5, a preferred embodiment of the present invention of a press type valve core comprises a case 1, a pressing structure 2, a stem seat 3 and a valve stem 4, wherein, one end of the case 1 is the first end 11, the other end is the second end 12, the two sides of the case 1 between the first end 11 and the second end 12 respectively have a first water outlet 13, the second end 12 is communicated with a water supply pipe (not shown in the drawing), the water supply pipe is communicated with at least one water source (not shown in the drawing), so that water can pass through the second end 12 and go into the case 1, the internal portion of the case 1 is formed with a first cavity 14 and a second cavity 15, the first cavity 14 is communicated with the first water outlet 13, while the second cavity 15 is communicated with the second end 12.

The pressing structure 2 is configured on the first end 11 of the case 1, the pressing structure 2 mainly comprises a lock nut 22, a pressing component 24 and a positioning component 26. The lock nut 22 and the pressing component 24 are respectively pivoted on the positioning component 26, and the lock nut 22 and the pressing component 24 are face to face in the axial direction. The lock nut 22 is used to press and actuate the pressing component 24, while the positioning component 26 is used for positioning the pressing component 24. The pressing component 24 is sleeved with a first spring 28, and the first spring 28 is configured to provide an elastic force for the pressing component 24 to go back toward the lock nut 22. By repeatedly pressing the lock nut 22, the pressing component 24 can have reciprocating movement between the two ends of a linear path, and when the pressing component 24 moves to one end of the aforesaid path, the positioning component 26 can stop and fix the pressing component 24. By the next time when the lock nut 22 presses the pressing component 24 again, the pressing component 24 moves to the other end of the aforesaid path, and the positioning component 26 will stop and fix the pressing component 24 again. The pressing component 24 is axially sleeved with a spring. The spring is to provide an elastic force for the pressing component 24 to go back to the lock nut 22.

The stem seat 3 is configured inside the case 1, and the valve stem 4 is pivoted on the stem seat 3.

The aforementioned constitution is identical to the prior art, and is readily known or can be easily understood by those skilled in the art.

Inside the case 1, an inner casing 5 is coupled. One end of the inner casing 5 is connected to the positioning component 26, the other end of the inner casing 5 is connected to a liner bushing 7, the two sides of the inner casing 5 between the two ends are respectively configured with a second water outlet 52, each of the second water outlets 52 is respectively communicated with each of the first water outlets 13, the first cavity 14 and the second cavity 15 are respectively formed inside the inner casing 5, and the first cavity 14 is communicated with each of the second water outlets 52. The internal portion of the inner casing 5 is configured with a separator 6. The inner casing 5 and the positioning component 26 are integrally formed. The inner casing 5 and the positioning component 26 can also be formed separately, if needed, and be combined to each other.

The separator 6 is located between the first cavity 14 and the second cavity 15, and thus separating the first cavity 14 from the second cavity 15. The separator 6 has an intercommunicating pore 62 along the axial direction, and the first cavity 14 and the second cavity 15 are communicated with each other through the intercommunicating pore 62.

The stem seat 3 is configured on the annular inner edge of the liner bushing 7, and the stem seat 3 is located between the second end 12 and the second cavity 15. The stem seat 3 is configured with an outer ring 31, a middle pipe 32 and a plurality of linking plates 33. The outer ring 31 is sleeved inside the liner bushing 7, the middle pipe 32 is pivotally configured on the annular center of the outer ring 31. Each of the linking plates 33 is respectively configured between the middle pipe 32 and the outer ring 31, and each of the linking plates 33 is connected to the middle pipe 32 and the outer ring 31, so that, between the middle pipe 32 and the outer ring 31, a plurality of passages 34 are formed. Each of the passages 34 is communicated with the second cavity 15 and the second end 12. The periphery of the middle pipe 32 is formed with a second guide plane 35, the second guide plane 35 being a conical surface, and the outer diameter of the second guide plane 35 decreases progressively from the end adjacent to the second cavity 15 to the end adjacent to the second end 12.

The valve stem 4 is configured inside the second cavity 15. The valve stem 4 and the pressing component 24 are face to face in the axial direction, so that the pressing component 24 can press the valve stem 4 to move toward the second end 12. The end of the valve stem 4 adjacent to the separator 6 is formed with a cap end 41. The other end of the valve stem 4 is pivoted on the middle pipe 32. The cap end 41 is sheathed with a seal 42. The outer diameter of the seal 42 is larger than the inner diameter of the intercommunicating pore 62, so that the seal 42 can block the communication between the intercommunicating pore 62 and the second cavity 15. The valve stem 4 is sleeved with a second spring 43 between the cap end 41 and the stem seat 3. One end of the second spring 43 is pressed against the stem seat 3, and the other end is pressed against the cap end 41, so that the valve stem 4 will move toward the separator 6. The peripheral radiating sides of the valve stem 4 are configured with a plurality of supporting wings 44. The outer end of each of the supporting wings 44 is respectively pressed against the peripheral wall of the second cavity 15, so as to enhance the motion stability of the valve stem 4.

The cap end 41 is configured with a casing pipe 45 toward the direction of the stem seat 3. One end of the second spring 43 goes inside the casing pipe 45. The periphery of the casing pipe 45 is formed with a first guide plane 46. The first guide plane 46 is a conical surface. The outer diameter of the first guide plane 46 decreases progressively from the end adjacent to the cap end 41 to the end adjacent to the stem seat 3. Thus, when the water flow passes through the stem seat 3 and goes into the second cavity 15, the conical first guide plane 46 will guide the water to flow toward the peripheral space of the cap end 41, and spread across the second cavity 15. The side of the cap end 41 adjacent to the separator 6 is formed with a spherical cambered surface 47. When the valve stem 4 moves toward the separator 6, the spherical cambered surface 47 can guide the alignment of the valve stem 4 and the intercommunicating pore 62 in the axial direction.

Furthermore, the side of the intercommunicating pore 62 adjacent to the second cavity 15 is expanded to form a third guide plane 64. The third guide plane 64 is a conical surface. The inner diameter of the third guide plane 64 increases progressively from the end adjacent to the first cavity 14 to the end adjacent to the second cavity 15, and the inner diameter of the third guide plane 64 at the side adjacent to the first cavity 14 is lower than the outer diameter of the seal 42. Thus, when the valve stem 4 moves toward the separator 6 and blocks the intercommunication between the second cavity 15 and the intercommunicating pore 62, the third guide plane 64 will guide the alignment of the seal 42 and the intercommunicating pore 62 in the axial direction, enhancing the reliability of the seal 42 to block the intercommunication between the second cavity 15 and the intercommunicating pore 62.

The case 1 is configured with a first valve slice 8 on the second end 12. The liner bushing 7 is connected to a second valve slice 9. The liner bushing 7 and the second valve slice 9 are integrally formed. The first valve slice 8 and the second valve slice 9 are pressed against each other and can rotate relatively to change the volume of water going into the second cavity 15. When the water inlet end 12 is communicated with a plurality of water sources supplying water of different temperatures, water of different temperatures can pass through the first valve slice 8 and the second valve slice 9 and go into the second cavity 15. By rotating the first valve slice 8, the volume of water of different temperatures going into the second cavity 15 can be changed. Thus, the temperature of the water passing through the first water outlet 13 and the second water outlet 52 and flowing outward can be adjusted.

The pressing component 24 is configured with a basal portion 242. One end of the first spring 28 is pressed against the basal portion 242, while the other end is pressed against the separator 6. The basal portion 242 is coupled with an annular portion 244. The first spring 28 is pressed against one end of the basal portion 242 and goes into the annular portion 244.

Figure 4:
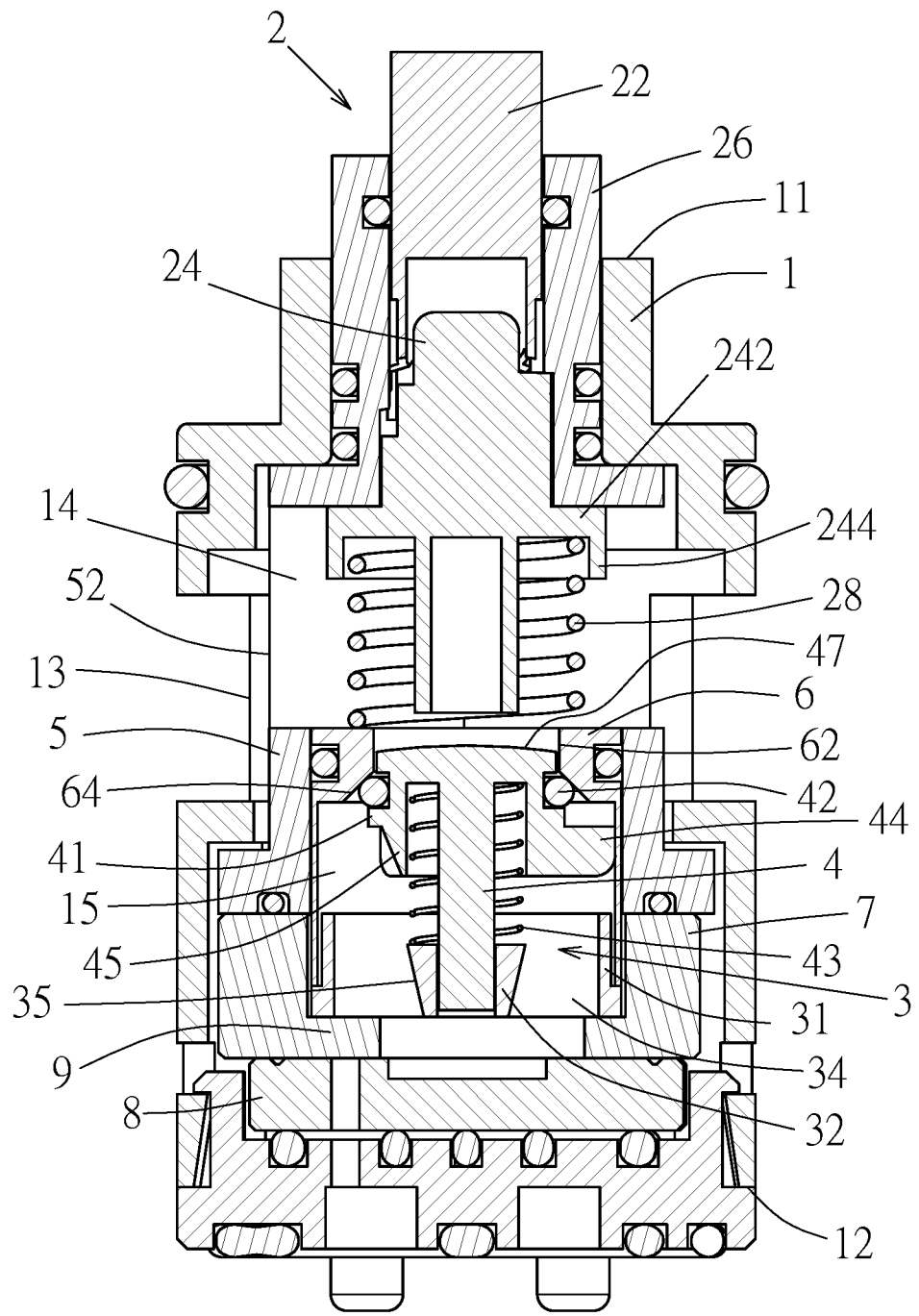
FIG. 4 is 4-4 sectional view of FIG. 2, indicating the blocked state between the first cavity and the second cavity.
Figure 5:
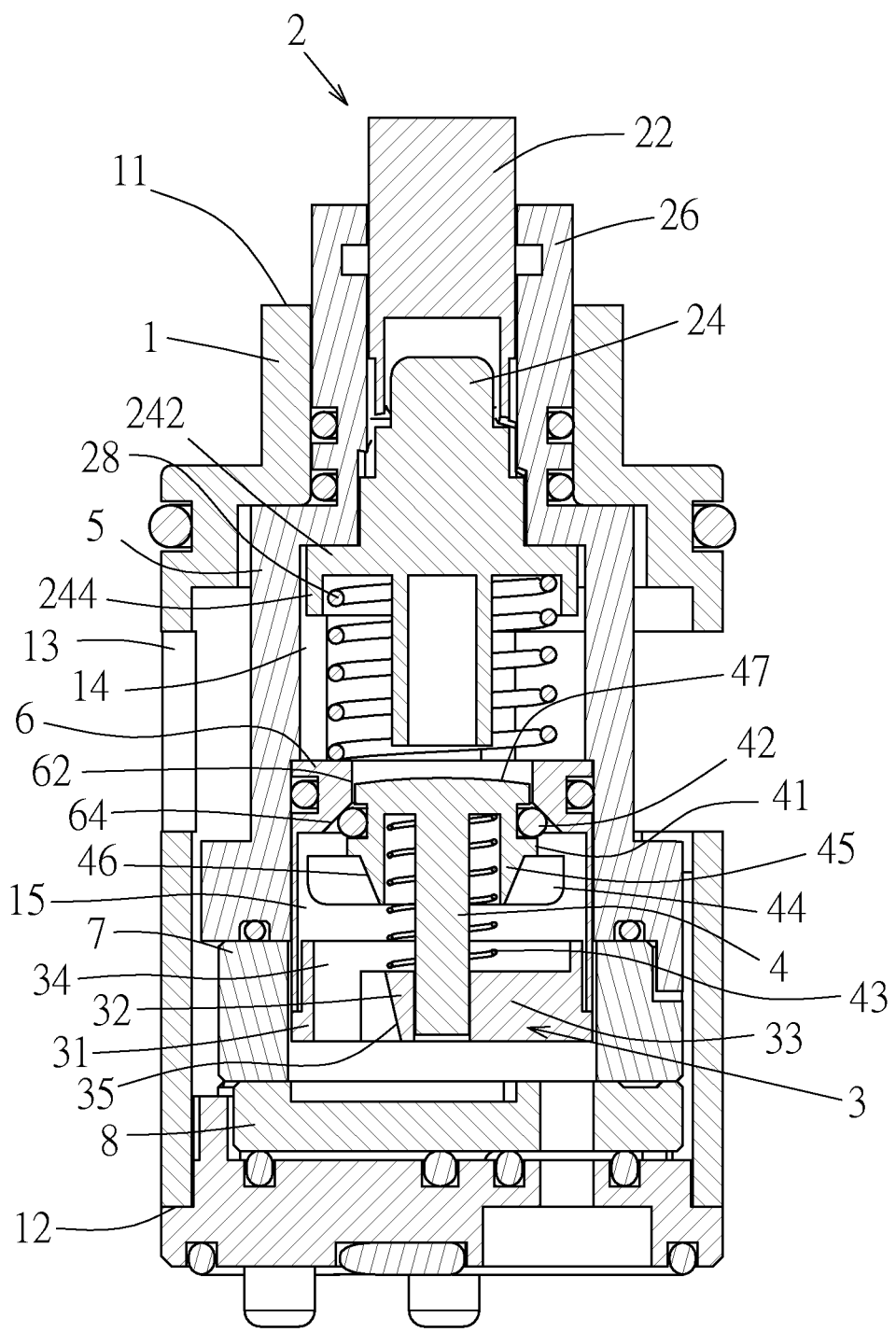
FIG. 5 is 5-5 sectional view of FIG. 2, indicating the blocked state between the first cavity and the second cavity.

FIG. 4 and FIG. 5 show the state of communication between the first cavity 14 and the second cavity 15 being blocked by the valve stem 4. Now, the pressing component 24 moves toward the first end 11, and the second spring 43 provides an elastic force to push the valve stem 4 to move toward the separator 6. The seal 42 tightly presses on the third guide plane 64, so that the communication between the intercommunicating pore 62 and the second cavity 15 is blocked. Water coming from the water source passes through the second end 12 and goes into the second cavity 15, but can not go into the first cavity 14 through the intercommunicating pore 62, and thus can not go further out of the case 1 through the second water outlet 52 and the first water outlet 46.

In particular, when the pressing component 24 moves toward the first end 11 and gets fixed, the first cavity 14 and the second cavity 15 are blocked by the valve stem 4 and are not intercommunicated. The pressing component 24 and the cap end 41 are face to face in the axial direction, but do not contact each other. Thus, between the pressing component 24 and the cap end 41, a space is formed for the pressing component 24 to move slightly toward the valve stem 4 but not to actuate the valve stem 4. If the lock nut 22 is slightly hit by a foreign object or touched by the user unconsciously, pushing the pressing component 24 to move slightly toward the valve stem 4, the valve stem 4 will not have a movement, and the intercommunication between the first cavity 14 and the second cavity 15 is still blocked. Therefore, the water faucet configured with the press type valve core of the present invention will not have slight leakage due to slight hit by a foreign object or unconscious touch by the operator.

Figure 6:
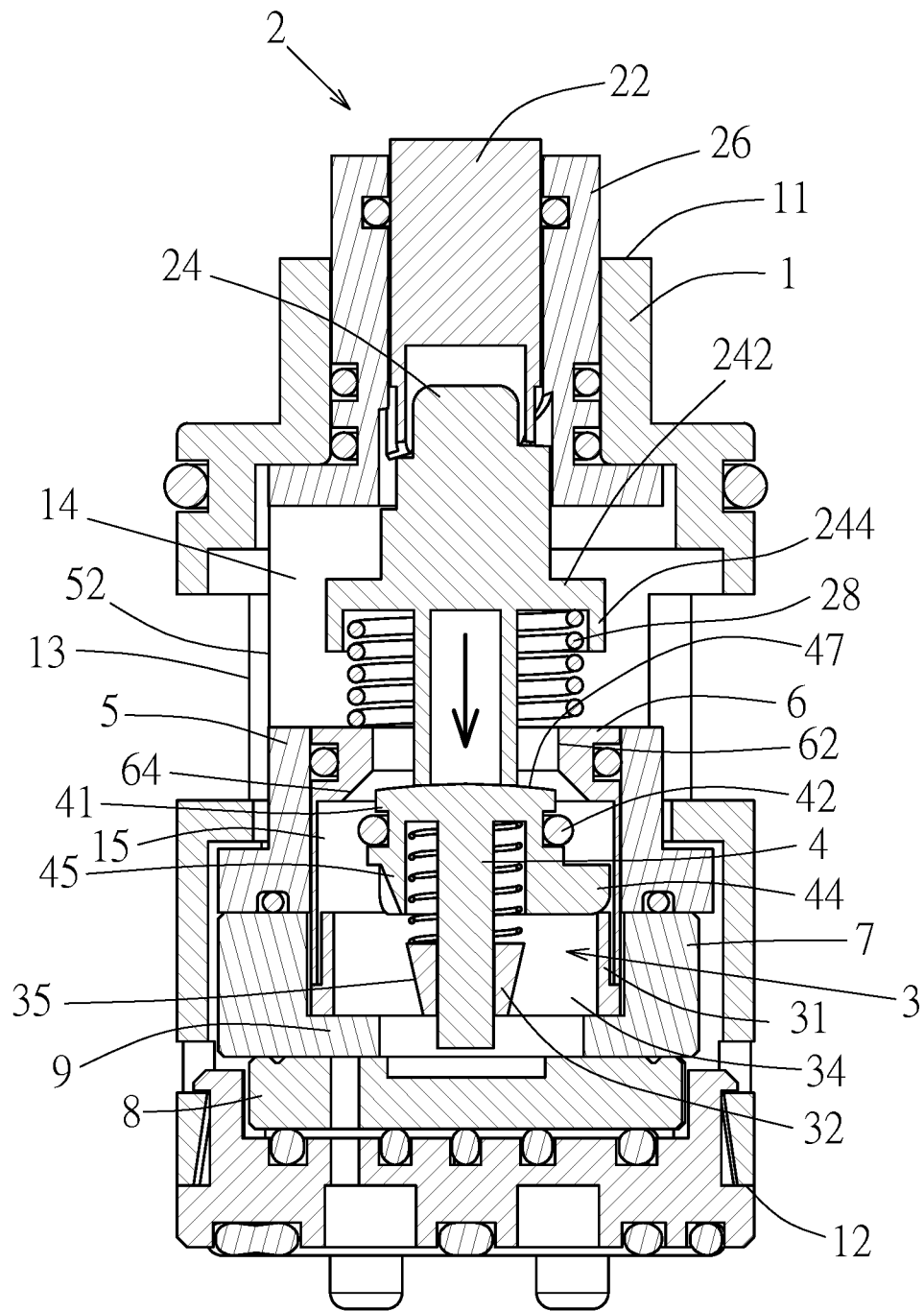
FIG. 6 is a sectional view of a preferred embodiment of the present invention, indicating the communicated state between the first cavity and the second cavity.

FIG. 6 shows the state of unblocked communication between the first cavity 14 and the second cavity 15. The user operates the pressing structure 2, pushing the lock nut 22 to move toward the second end 12. The lock nut 22 pushes the pressing component 24 to move toward the second end 12. The pressing component 24 contacts the cap end 41 and presses the valve stem 4 to move toward the second end 12. The seal 42 goes away from the separator 6, and the intercommunicating pore 62 and the second cavity 15 are communicated with each other. Water coming from the water source passes through the second end 12 and goes into the second cavity 15, and then goes into the first cavity 14 through the intercommunicating pore 62, and further goes out of the case 1 through the second water outlet 52 and the first water outlet 13.

On the basis of the above structural constitution and technical features, as the outer end of each of the supporting wings 44 is pressed against the inner edge of the liner bushing 7, when the valve stem 4 is actuated, the supporting wings 44 can maintain the axle center of the valve stem 4. Even under the influence of water flow or gravity, the axle center of the valve stem 4 will not have deviation. Thus, biased abrasion and wearing between the valve stem 4 and the stem seat 3 will not happen, and the reliability of flow path control can be enhanced.

When the first cavity 14 and the second cavity 15 are blocked by the valve stem 4 and are not communicated with each other, the pressing component 24 and the valve stem 4 are face to face by not contacting each other, thus avoiding the problem that the state of blocked intercommunication between the first cavity 14 and the second cavity 15 is easily released due to slight hit by a foreign object or unconscious contact by the user. The reliability of flow path control is enhanced.

Furthermore, when water goes into the second cavity 15 from the first end 11, the conical first guide plane 46 and the second guide plane 35 can effectively guide the direction of the water flow, and spread the water across the second cavity 15.

I claim:

1. A press type valve core comprising:
    a case having a first end and a second end, said case having a first water outlet at each of two sides of said case, the second end of said case communicating with a water supply pipe, said case having a first cavity and a second cavity in an interior of said case, the first cavity communicating with the first water outlets, the second cavity communicating with the second end of said case;
    a pressing structure positioned at the first end of said case, said pressing structure comprising a lock nut, a pressing component and a positioning component, the lock nut pressing on the pressing component, the positioning component positioning the pressing component, the pressing component having a first spring sleeved thereon, the first spring urging the pressing component toward the lock nut;
    a stem seat positioned in an interior of said case;
    a valve stem pivotally mounted to said stem seat;
    an inner casing positioned in the interior of said case, said inner casing having one end connected to the positioning component, another end of said inner casing being connected to a liner bushing, said inner casing having a pair of sides each having a second water outlet, the second water outlets respectively communicating with the first water outlets, the first cavity and the second cavity being formed within said inner casing, the first cavity communicating with the second water outlets; and
    a separator positioned in an internal portion of said inner casing, said separator positioned between the first cavity and a second cavity, said separator having an intercommunicating pore through which the first cavity and a second cavity communicate with each other, wherein said stem seat is positioned on an annular inner edge of the liner bushing, the stem seat being located between the second end of said case and the second cavity, said stem seat having a plurality of channels, each channel of the plurality of channels respectively communicating with the second end of the case and the second cavity, wherein said valve stem is positioned inside the second cavity, said valve stem being in face-to-face relationship with the pressing component such that the pressing component urges said valve stem toward the second end of said case, said valve stem having one end formed with a cap end, said valve stem having another end pivotally mounted to said stem seat, wherein the cap end has a seal sheathed thereto, an outer diameter of the seal being larger than an inner diameter of the intercommunicating pore such that the seal can block communication between the intercommunicating pore and the second cavity, said valve stem being sleeved with a second spring extending between the cap end and said stem seat, the second spring having one end urging against said stem seat and another end urging against the cap end such that said valve stem moves toward said separator, said valve stem having peripheral radiating sides with a plurality of supporting wings, an outer end of each of the plurality of supporting wings respectively urging against a peripheral wall of the second cavity.

2. The press type valve core of claim 1, wherein the cap end has a casing pipe extending toward said stem seat, the casing pipe receiving the one end of the second spring, the casing pipe having a first guide plane formed at a periphery of the casing pipe, the first guide plane being a conical surface, the first guide plane having an outer diameter that decreases progressively from an end adjacent to the cap end to an end adjacent to said stem seat.

3. The press type valve core of claim 2, wherein said stem seat has an outer ring, a middle pipe and a plurality of linking plates, the outer ring being sleeved inside the liner bushing, the middle pipe being pivotally mounted at an annular center of the outer ring, each of the plurality of linking plates being respectively positioned between the middle pipe and the outer ring, the middle pipe having a second guide plane formed at a periphery thereof, the second guide plane being a conical surface, an outer diameter of the second guide plane decreasing progressively from an end adjacent the second cavity to an end adjacent the second end of said case, said valve stem pivotally mounted on the middle pipe.

4. The press type valve core of claim 3, wherein one end of the intercommunicating pore defines a third guide plane, the third guide plane being a conical surface, an inner diameter of the third guide plane increasing progressively from an end adjacent to the first cavity to an end adjacent the second cavity, the inner diameter of the third guide plane at the end adjacent to the first cavity being less than an outer diameter of the seal.

5. The press type valve core of claim 1, wherein one end of the cap end is adjacent said separator, the one end of the cap end having a spherical cambered surface.

6. The press type valve core of claim 1, wherein said case has a first valve slice on the second end thereof, the liner bushing being connected to a second valve slice, the first valve slice and the second valve slice pressing against each other and rotatable relative to each other.

7. The press type valve core of claim 1, wherein the pressing component has a basal portion, the one end of the first spring bearing against the basal portion, the another end of the first spring bearing against the separator.

8. The press type valve core of claim 7, wherein the basal portion is coupled to an annular portion, the first spring received in the annular portion.

* * * * *